US012603719B2

(12) United States Patent
Kurata

(10) Patent No.: US 12,603,719 B2
(45) Date of Patent: Apr. 14, 2026

(54) CLOCK PROCESSING DEVICE AND PROGRAM

(71) Applicant: SEIKO SOLUTIONS INC., Chiba (JP)

(72) Inventor: Yosuke Kurata, Chiba (JP)

(73) Assignee: SEIKO SOLUTIONS INC., Chiba (JP)

( * ) Notice: Subject to any disclaimer, the term of this patent is extended or adjusted under 35 U.S.C. 154(b) by 337 days.

(21) Appl. No.: 18/290,494

(22) PCT Filed: Dec. 10, 2021

(86) PCT No.: PCT/JP2021/045570
§ 371 (c)(1),
(2) Date: Nov. 14, 2023

(87) PCT Pub. No.: WO2022/244287
PCT Pub. Date: Nov. 24, 2022

(65) Prior Publication Data
US 2024/0267145 A1 Aug. 8, 2024

(30) Foreign Application Priority Data
May 17, 2021 (JP) ................................. 2021-083229

(51) Int. Cl.
*H04J 3/06* (2006.01)
(52) U.S. Cl.
CPC .......... *H04J 3/0667* (2013.01); *H04J 3/0682* (2013.01)
(58) Field of Classification Search
CPC ......... H04J 3/0667; H04J 3/0682; H04L 7/00; G04G 5/00
See application file for complete search history.

(56) References Cited

U.S. PATENT DOCUMENTS

2015/0295669 A1* 10/2015 Chapman ............... H04B 3/542
370/503

FOREIGN PATENT DOCUMENTS

JP 2014216669 A 11/2014
JP 2016025474 A 2/2016
(Continued)

OTHER PUBLICATIONS

Final characterization of InLambda delay standards for Supplementary Time Interval Comparison: Albin Czubla, Piotr Szterk, Roman Osmyk Time and Frequency Laboratory Central Office of Measures (GUM) (Year: 2018).*

(Continued)

*Primary Examiner* — Nizam U Ahmed
(74) *Attorney, Agent, or Firm* — BROOKS KUSHMAN P.C.

(57) ABSTRACT

In a clock processing device (10), a one-way delay difference calculation unit (26) calculates a first one-way delay difference and a second one-way delay difference. An RTT acquisition unit (28) acquires information to calculate an RTT. A delay estimation unit (32) estimates a first one-way delay. A one-way delay range update unit (30) obtains a first one-way delay difference and a second one-way delay difference, and updates a valid range of the first one-way delay, the valid range being determined by using the first one-way delay difference and the second one-way delay difference. A determination unit (34) determines whether or not the estimated first one-way delay is consistent using the valid range of the first one-way delay.

4 Claims, 9 Drawing Sheets

(56) References Cited

FOREIGN PATENT DOCUMENTS

| JP | 6684409 | B1 | 4/2020 |
| JP | 2020091134 | A | 6/2020 |

OTHER PUBLICATIONS

Choi et al., One-way delay estimation and its application, Computer Communications, vol. 28, No. 7, pp. 819-828, available online Dec. 15, 2004.

Kim et al., One-way delay estimation without clock sychronization, IEICE Electronics Express, vol. 4, No. 23, pp. 717-723, 2007.

International Search Report of PCT/JP2021/045570 mailed Mar. 1, 2022, 5 pages.

Li et al., Improvement of Precise Time Synchronization Algorithm based on IEEE1588, 2010 International Conference on Computer, Mechatronics, Control and Electronic Engineering, Aug. 26, 2010, pp. 70-73, https://ieeexplore.ieee.org/stamp/ stamp.jsp?tp=&arnumber=5609633.

* cited by examiner

CLOCK PROCESSING DEVICE AND PROGRAM

CROSS-REFERENCE TO RELATED APPLICATIONS

This application is a U.S. national phase of International Application No. PCT/JP2021/045570, filed on Dec. 10, 2021, which claims priority to Japanese Patent Application No. 2021-083229, filed on May 17, 2021, the disclosures of which are hereby incorporated in their entirety by reference herein.

TECHNICAL FIELD

The present disclosure relates to a clock processing device and a program, and more particularly, to a clock processing device and a program for adjusting a clock of the own device.

BACKGROUND ART

Conventionally, there are time servers that acquire time information from a reference clock, matches a precise clock of its own device, and distributes a time to a subordinate device.

The time server receives the time information from the reference clock, and recognizes a time difference between its own clock and the reference clock. The current rate of the own clock is usually determined by calculation based on the time difference.

Furthermore, in Choi, J.-H. and Yoo, C. "One-way delay estimation and its application." Computer Communications, Vol. 28, No. 7, pp. 819-828, 2005, a practical one-way delay estimation method using round-trip time (RTT) is disclosed. In Choi, J.-H. and Yoo, C. "One-way delay estimation and its application." Computer Communications, Vol. 28, No. 7, pp. 819-828, 2005, a one-way delay is estimated over generic transmission control protocol (TCP). TCP has a retransmission time out (RTO) mechanism for retransmission, and measures RTT for RTO setting. Furthermore, in Japanese Patent Publication (JP-B2) No. 6684409, a one-way delay is estimated using two internal clocks.

SUMMARY OF INVENTION

Technical Problem

In time synchronization in a packet-exchanging method used in a network time protocol (NTP) and a precision time protocol (PTP), time stamps are exchanged between a server and a client as illustrated in FIG. 9 in order to know a one-way delay from the server to the client and a time difference between the server and the client. This exchange method is referred to as a $T_1$-$T_4$ method for convenience.

In this method, a one-way delay is calculated as follows.

$$D(t_4) = \frac{(t_4 - t_1) - (T_3 - T_2)}{2} \quad (1)$$

The newest $t_1$, $T_2$, $T_3$, $t_4$ are required for the calculation, and the calculation is enabled immediately after $t_4$ is acquired.

In the $T_1$-$T_4$ method, it is assumed that each one-way delay is the same in the upstream and the downstream. Since all of $t_1$, $T_2$, $T_3$, and $t_4$ have been known at the time $t_4$ is known, a time difference $O(t_4)$ between the server and the client at that time is calculated as follows.

$$O(t_4) = (T_3 + D(t_4)) - t_4$$

$$= \frac{(T_2 - t_1) + (T_3 - t_4)}{2}$$

Therefore, in a case where the one-way delay is different between the upstream and the downstream, the time difference is incorrect. However, in this method, even if the clocks of the server and the client do not match, a reasonably accurate one-way delay can be obtained.

In particular, in the case of the NTP, about 1 millisecond is assumed as accuracy and precision of time synchronization, and such a calculation error of the one-way delay is often negligible unless the server is extremely far away. However, in the case of the PTP, it is often so large that it cannot be ignored.

The present disclosure has been made to solve the above problems, and an objective of the present disclosure is to provide a clock processing device and a program capable of accurately obtaining a one-way delay even in a case where the one-way delay is different between upstream and downstream.

Solution to Problem

A first aspect of the present disclosure is a clock processing device including: a clock unit that outputs current time information; a communication unit that receives a first message including time information of a reference clock from a reference clock device, transmits, to the reference clock device, a second message including time information of the clock unit, and receives time information of the reference clock when the reference clock device received the second message; a one-way delay difference calculation unit that sets, as a temporary first one-way delay, a difference between the time information of the reference clock included in the first message and the time information of the clock unit when the first message is received and calculates a first one-way delay difference that is a difference between the temporary first one-way delays, and sets, as a temporary second one-way delay, a difference between the time information included in the second message and the time information of the reference clock when the second message is received and calculates a second one-way delay difference that is a difference between the temporary second one-way delays; an information acquisition unit that acquires information for calculating a round-trip delay that is a sum of the temporary first one-way delay and the temporary second one-way delay using a combination of the first message and the second message to be calculated; a delay estimation unit that estimates a first one-way delay or a second one-way delay using a predetermined estimation method; and a determination unit that calculates a first one-way delay difference that is a difference between a shortest time of the temporary first one-way delay and the latest temporary first one-way delay, calculates a second one-way delay difference that is a difference between a shortest time of the temporary second one-way delay and the latest temporary second one-way delay, and determines whether or not the first one-way delay or the second one-way delay estimated by the delay estimation unit is consistent by using a valid range of the first one-way delay or the second one-way delay determined using the information acquired by the information acquisition unit, the calculated first one-way delay differ-ence, and the calculated second one-way delay difference.

A second aspect of the present disclosure is a program for causing a computer to function as each unit of the clock processing device of the first aspect.

Advantageous Effects of Invention

According to the present disclosure, it is possible to accurately obtain the one-way delay even in a case where the one-way delay is different between the upstream and the downstream.

DESCRIPTION OF EMBODIMENTS

Figure 1:
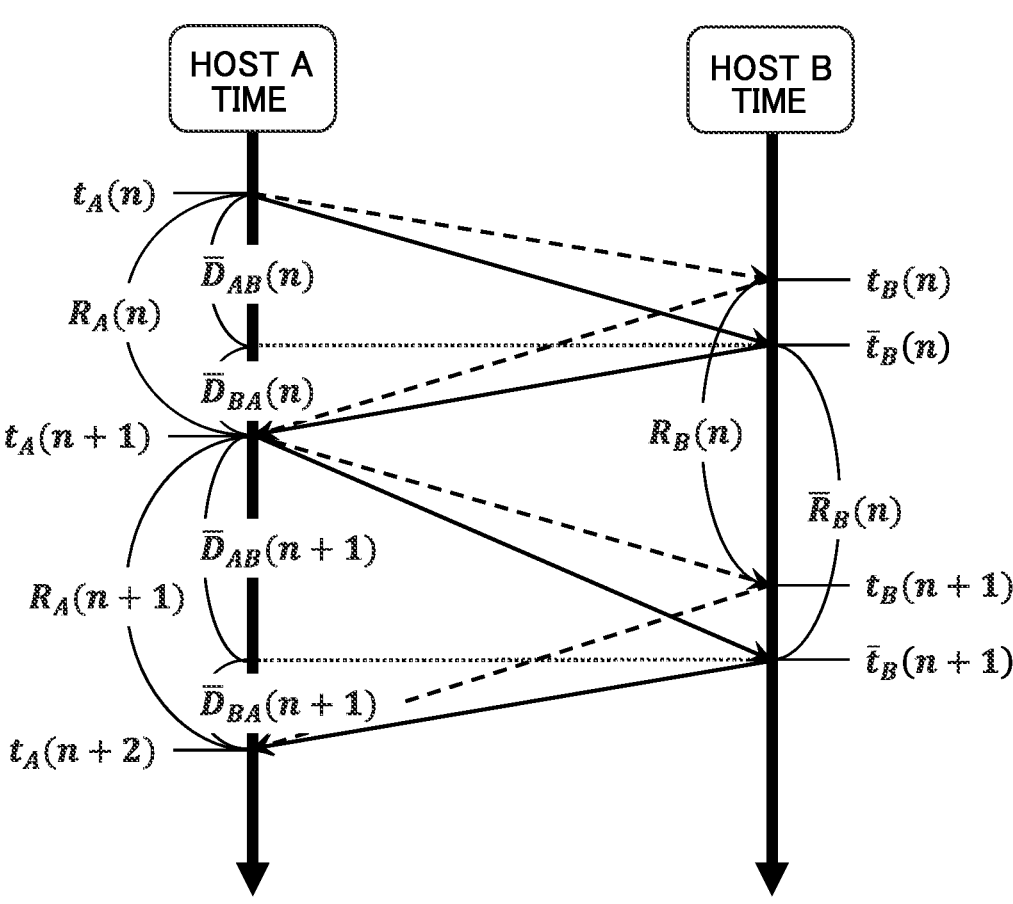
FIG. 1 is a diagram for explaining a one-way delay and a round-trip delay.

Hereinafter, embodiments of the present disclosure will be described in detail with reference to the drawings.

Principle of Embodiment of Present Disclosure

First, a principle of an embodiment of the present disclosure will be described.

The PTP is a client server type time synchronization protocol similar to the NTP, and a PTP grand master (also referred to as a PTP master) as a reference clock device and a PTP slave can perform time synchronization with accuracy and precision of about several nanoseconds to several tens of nanoseconds. The reason why the PTP can perform time synchronization with such accuracy and precision is that the grand master and the slave uses hardware with extremely small fluctuation for time stamp.

Furthermore, in order to maintain such synchronization accuracy and precision, all intermediate network devices (router/L3 switch and L2 switch) between the grand master and the slave need to support the PTP. However, making all devices PTP compatible in this way is generally high cost. In particular, it is still easy to make the inside of a self-managed local area network (LAN) compatible with the PTP, but it is difficult to make all networks compatible with the PTP in a case where a non self-managed network is interposed between the grand master and the slave.

A network in which all network devices through which the PTP flows support the PTP is referred to as a PTP aware network, and the other networks are referred to as a PTP unaware network. In a case where the PTP is operated in the PTP unaware network, even if the grand master and the slave support the hardware time stamp, accuracy and precision decrease in the intermediate network, and there may be a possibility that synchronization accuracy generally decreases to the same level as that of the NTP. However, in a case where the intermediate network does not support the PTP, but is about several L2 switches having a low latency, it is highly likely that sufficient accuracy and precision can be secured.

In view of the above, in the present embodiment, a new method for preventing a decrease in synchronization accuracy and precision between the PTP master and the PTP slave in the PTP unaware network is proposed. In the PTP protocol, a time stamped message is exchanged between the PTP master and the PTP slave for synchronization. A difference between one-way delays can always be measured by the time stamp. In the present embodiment, a possible range of the correct one-way delay is getting narrower and narrower on the basis of a change in the difference between the one-way delays. In particular, in the PTP unaware network, it is possible to estimate the one-way delay relatively accurately with respect to the conventional method, and as a result, accuracy and precision of time synchronization can be improved.

\<Prior Research\>

Non Patent Literatures 1 and 2 propose practical one-way delay estimation methods using an RTT. Non Patent Literature 1 estimates a one-way delay not for a time synchronization protocol targeted in the present embodiment but for an entire TCP protocol.

Non Patent Literature 2: Kim, D. and Lee, J. One-way delay estimation without clock synchronization. IEICE Electronics Express, Vol. 4, No. 23, pp. 717-723, 2007.

Non Patent Literature 2 proposes a method for further increasing the estimation accuracy of Non Patent Literature 1.

FIG. 1 is a diagram for understanding methods of Non Patent Literatures 1 and 2. The drawing illustrates exchange of messages between a host A and a host B.

In FIG. 1, $t_A$ and $t_B$ respectively represent a time in the clock of the host A and a time in the clock of the host B, and the clocks of the host A and the host B are not necessarily synchronized. Hereinafter, for convenience, it is assumed that the clock of the host A is a "correct" clock. Furthermore, each amount is defined as follows.

$t_A(n)$ is a time indicated by the host A clock when the nth message is transmitted from the host A. That is, $t_A(n)$ is a time at which the (n−1)th reply is received from the host B.

$t_B(n)$ is a time indicated by the host B clock when the nth message is received by the host B (and sent back to the host A at the same time).

$^-t_B(n)$ is a correct time (time in the host A clock) when the nth message is received by the host B. Here, a variable X with a bar in the drawing or equations is expressed as $^-X$.

$^-D_{AB}(n)$ is a one-way delay from the host A to the host B of the nth message. That is, $^-D_{AB}(n)=^-t_B(n)-t_A(n)$.

$^-D_{BA}(n)$ is a one-way delay until a reply to the nth message arrives from the host B to the host A. That is, $^-D_{BA}(n)=t_A(n+1)-^-t_B(n)$.

$R_A(n)$ is an RTT by the host A clock of the nth message. That is, $R_A(n)=t_A(n+1)-t_A(n)$.

$R_B(n)$ is an RTT by the host B clock of the nth reply message. That is, $R_B(n)=t_B(n+1)-t_B(n)$.

<table>
<tr><td>5</td><td>6</td></tr>
</table>

$\bar{R}_B(n)$ is an RTT by a correct time (host A clock) of the nth reply message. That is, $\bar{R}_B(n) = \bar{t}_B(n+1) - \bar{t}_B(n) = \bar{D}_{BA}(n) + \bar{D}_{AB}(n+1)$.

$O_B(n)$ is an offset between the host B clock and the correct time (host A clock) when the nth message is received by the host B. That is, $O_B(n) = \bar{t}_B(n) - t_B(n)$.

Here, an important idea is that a difference in elapsed time between the host A clock and the host B clock is negligibly small if the elapsed time is up to about 100 milliseconds at the longest as in the RTT. In the case of FIG. 1, it is assumed that the following equation holds.

$$R_B(n) \approx \bar{R}_B(n)$$

Assuming as above, true one-way delay differences $\bar{J}_A(n)$ and $\bar{J}_B(n)$ in respective directions can be approximated and calculated as follows from the RTT.

$$\bar{J}_A(n) = \bar{D}_{AB}(n+1) - \bar{D}_{AB}(n)$$
$$= \bar{R}_B(n) - R_A(n) \approx R_B(n) - R_A(n)$$
$$\bar{J}_B(n) = \bar{D}_{BA}(n+1) - \bar{D}_{BA}(n)$$
$$= R_A(n+1) - \bar{R}_B(n) \approx R_A(n+1) - R_B(n)$$

The present inventor defines that $J_A(n) = R_B(n) - R_A(n)$, and $J_B(n) = R_A(n+1) - R_B(n)$. Since the one-way delay difference can be calculated as described above, when the initial one-way delay $\bar{D}_{AB}(0)$ or $\bar{D}_{BA}(0)$ is known, all the one-way delays are determined.

However, the initial one-way delay is not known from the RTT, and in Non Patent Literature 1, a possible range of $\bar{D}_{AB}(0)$ is determined for each of the three cases as follows.

Case 1: In the case of $\bar{D}_{AB}(0) > \bar{D}_{BA}(0)$:

$$\frac{R_A(1) - R_B(1) + R_B(0)}{2} < \bar{D}_{AB}(0) < R_A(0)$$

Case 2: In the case of $\bar{D}_{AB}(0) < \bar{D}_{BA}(0)$:

$$\frac{R_A(1) - R_B(1) + R_B(0)}{2} > \bar{D}_{AB}(0) > 0$$

Case 3: In the case of $\bar{D}_{AB}(0) = \bar{D}_{BA}(0)$:

$$\bar{D}_{AB}(0) = \frac{R_A(0)}{2}$$

Then, in a plurality of samples, when a $\bar{D}_{AB}$ value is 70% or more of the RTT, a midpoint $(R_A(1) - R_B(1) + R_B(0) + 2R_A(0))/4$ of a range of Case 1 is adopted as $\bar{D}_{AB}(0)$, when the $\bar{D}_{AB}$ value is 30% or less, a midpoint $(R_A(1) - R_B(1) + R_B(0))/2$ of a range of Case 2 is adopted as $\bar{D}_{AB}(0)$, and when the $\bar{D}_{AB}$ value is neither greater than or equal to 70% of the RTT nor less than or equal to 30% of the RTT, $R_A(0)/2$ is adopted as $\bar{D}_{AB}(0)$.

On the other hand, in Non Patent Literature 2, first, in a case where $R_A(n)$ measurement and $R_A(n+1)$ measurement are performed within a short time, a time difference from the correct time of the host B clock is almost the same, that is, it is also assumed that the following equation holds.

$$O_B(n) \approx O_B(n+1)$$

Then, the present inventor focuses on $J_A(n)$ and $J_B(n)$. If the following equation holds, $$\frac{J_A(n)}{J_B(n)} \approx \frac{\bar{D}_{AB}(n)}{\bar{D}_{BA}(n)} \approx \frac{\bar{D}_{AB}(n+1)}{\bar{D}_{BA}(n+1)}$$

first, a proportional distribution value is temporarily placed as follows.

$$A(n) = R_A(n) \cdot \frac{J_A(n)}{J_A(n) + J_B(n)}$$
$$B(n) = R_A(n) - A(n)$$
$$A(n+1) = R_A(n+1) \cdot \frac{J_A(n)}{J_A(n) + J_B(n)}$$
$$B(n+1) = R_A(n+1) - A(n+1)$$

If the clocks of the host A and the host B are synchronized at this time, the following equations are satisfied.

$$A(n) = t_B(n) - t_A(n) \qquad (3)$$
$$B(n) = t_A(n+1) - t_B(n)$$
$$A(n+1) = t_B(n+1) - t_A(n+1)$$
$$B(n+1) = t_A(n+2) - t_B(n+1)$$

In Non Patent Literature 2, assuming that Equation (3) holds even in a case where the clocks of the host A and the host B are not synchronized, it is considered that Equation (2) holds with an error.

Next, assuming that Equation (3) holds in a case where the synchronization is not established, an estimated time difference $O_{B.est}(n)$ is calculated as follows:

$$O_{B.est}(n) = \begin{cases} \min\{A(n), A(n+1)\} & \text{if } O_B(n) > 0 \\ -\min\{B(n), B(n+1)\} & \text{if } O_B(n) < 0 \end{cases}$$

In addition, the following equations are assumed.

$$D_{AB}(n) = A(n) + O_{B.est}(n)$$
$$D_{BA}(n) = B(n) - O_{B.est}(n)$$
$$D_{AB}(n+1) = A(n+1) + O_{B.est}(n)$$
$$D_{BA}(n+1) = B(n+1) - O_{B.est}(n)$$

What is important in this idea is that a time difference from the host B clock falls within a range in which Equation (3) holds and Equation (4) holds. On the other hand, Non Patent Literature 2 proposes the following determination conditions 1) to 3).

1) $R_A(n)$, $R_B(n)$, and $R_A(n+1)$ can be normally acquired.

2) Either $\{J_A(n)>0 \text{ and } J_B(n)>0\}$ or $\{J_A(n)<0 \text{ and } J_B(n)<0\}$ holds.

3) $t_A(n)<t_B(n)<t_A(n+1)<t_B(n+1)<t_A(n+2)$ holds.

In an implementation, the one-way delay is calculated only in a case where the above determination conditions are satisfied. These determination conditions are certainly necessary conditions for satisfying Equation (2). However, these are too obvious, and it seems that upstream and downstream delay ratios are generally determined in many cases in the DSL rather than that these determination conditions have a direct effect on the estimation of the one-way delay, and it is claimed that the one-way delay is estimated correctly with a high probability, if the above necessary conditions are met.

However, as can be seen from the first intention that Equation (3) is set, in short, it is just said that the one-way delay is selected such as the clocks of the host A and the host B are synchronized as much as possible. Such an idea is inappropriate as a method for time synchronization.

<Term Definition and Properties in PTP>

Figure 2:
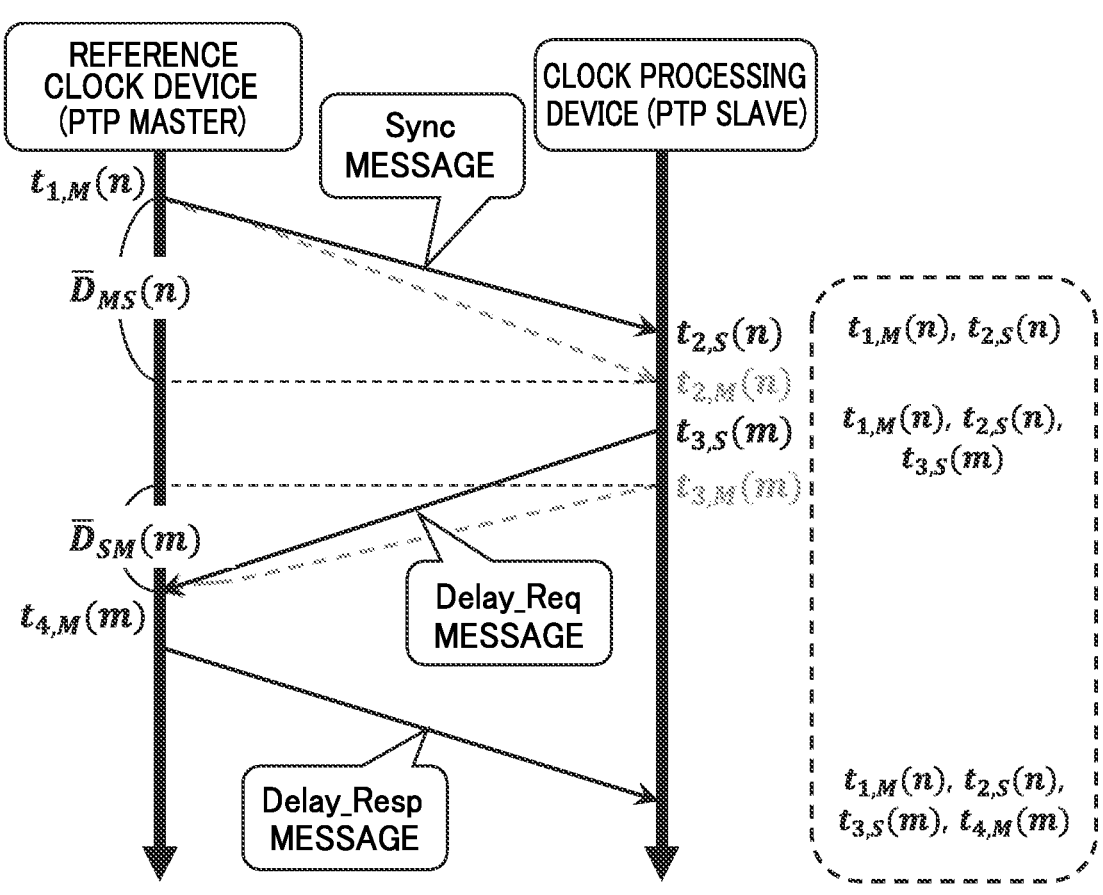
FIG. 2 is a diagram for explaining a Sync message, a Delay_Req message, and a Delay_Resp message.

A method of simple calculation of the one-way delay in the time synchronization protocol is as shown in Equation (1) described above. In the case of the PTP, specifically, as illustrated in FIG. 2, a Sync message, a Delay_Req message, and a Delay_Resp message are exchanged. Various variables in the drawing follow those defined in FIG. 1.

The calculation of the most standard one-way delay $D(n, m)$ and the time difference $O(n, m)$ by using the nth Sync message and the mth Delay_Req message (Delay_Resp message) between the PTP master and the PTP slave are as follows.

$$D(n, m) = \frac{(t_{4,M}(m) - t_{1,M}(n)) - (t_{3,S}(m) - t_{2,S}(n))}{2}, \quad (5)$$

$$O(n, m) = (t_{1,M}(n) + D(n, m)) - t_{2,S}(n)$$

$$= \frac{(t_{1,M}(n) - t_{2,S}(n)) - (t_{4,M}(m) - t_{3,S}(m))}{2}$$

Figure 3:
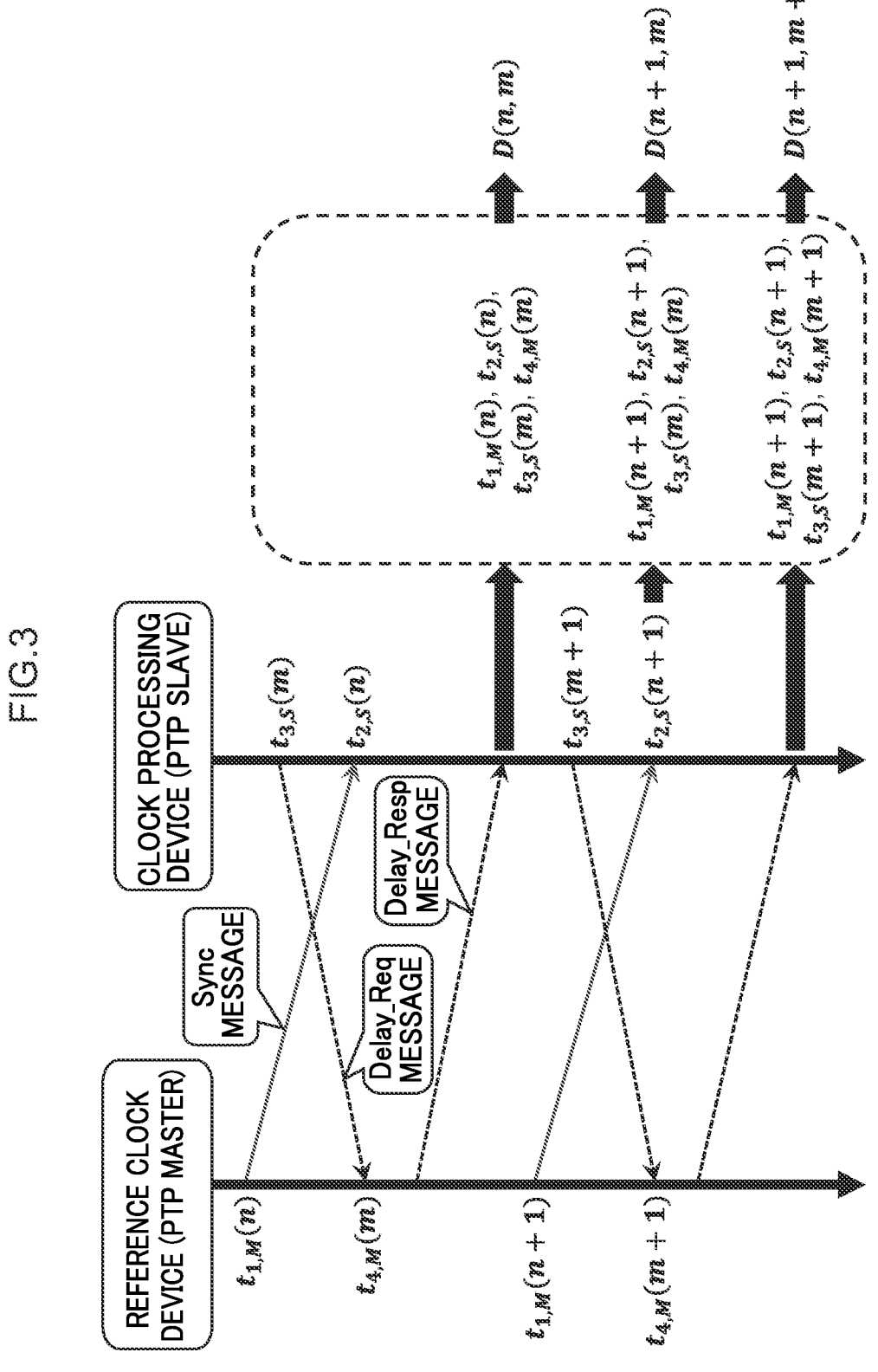
FIG. 3 is a diagram illustrating an example of a one-way delay calculated every time a message is received.

Furthermore, actually, as illustrated in FIG. 3, the acquisition of the $(t_{1,M}( \ ), t_{2,S}( \ ))$ and the acquisition of the $(t_{3,S}( \ ), t_{4,M}( \ ))$ are done asynchronously. Therefore, the one-way delay $D=D(i, j)$ can be calculated by the latest $(t_{1,M}( \ ), t_{2,S}( \ ), t_{3,S}( \ ), t_{4,M}( \ ))$ at that time.

Meanwhile, in a case where the exchange between the Sync message and the Delay_Req message (Delay_Resp message) is performed asynchronously, the apparent RTT on a side of the PTP master using the nth Sync message and the mth Delay_Req message is calculated so that a response waiting time on a side of the PTP slave is eliminated as follows.

$$R_M(n, m) = (t_{4,M}(m) - t_{1,M}(n)) - (t_{3,S}(m) - t_{2,S}(n))$$

Note that the response waiting time on the side of the PTP slave is measured by the clock of the PTP slave.

Therefore, considering the apparent RTT for arbitrary n and m, there exist a case where the error is large with respect to the true RTT. In order to obtain the RTT as accurate as possible, it is necessary that the timings of reception of the Sync message and transmission of the Delay_Req message are sufficiently short.

For example, in a case where a rate of the clock of the PTP slave is deviated by ±0.1 ppm with respect to a rate of the clock of the PTP master, when a period from $t_{2,S}(5)$ to $t_{3,S}(5)$, which is the fifth period in both the Sync message and the Delay_Req message, is 15 milliseconds, an error from the correct time of the period is ±1.5 nanoseconds. With such an error, the PTP is at a negligible level (reliable RTT), but when a period from $t_{2,S}(5)$ to $t_{3,S}(20)$ is 30 seconds for the fifth Sync message and the twentieth Delay_Req message, an error from the correct time is ±3 microseconds, which is a non-negligible value. Here, the rate is a degree of advance or delay of the clock, and is, for example, a length (nanosecond) that makes faster or slower per second.

The apparent RTT $R_S(n, m)$ on the side of the PTP slave is similarly defined, but since $R_S(n, m)=(t_{2,S}(n)-t_{3,S}(m))-(t_{1,M}(n)-t_{4,M}(m))$, finally $$R_M(n, m) = R_S(n, m)$$

is obtained. From this, it is practically unnecessary to consider the side of the PTP master and the side of the PTP slave, and $R_M(n, m)$ and $R_S(n, m)$ are simply represented by $R(n, m)$. The above results are summarized to obtain the following definitions.

(Definition 1 (Reliable RTT))

For a difference $|t_{3,S}(m)-t_{2,S}(n)|$ between a reception timing $t_{2,S}(n)$ of the nth Sync message and a transmission timing $t_{3,S}(m)$ of the mth Delay_Req message, if an error between this difference and the correct elapsed time is negligibly small, the present inventor calls $$R(n, m) = (t_{4,M}(m) - t_{1,M}(n)) - (t_{3,S}(m) - t_{2,S}(n))$$

a reliable RTT.

In the above Definition 1, in order to minimize the error between the value of $|t_{3,S}(m)-t_{2,S}(n)|$ and the correct elapsed time, it is of course necessary to reduce the error between the rate of the clock of the PTP master and the rate of the clock of the PTP slave, but it is also important that the value of the PTP slave clock is not step-adjusted (the step-adjustment is an adjustment of the value of the clock, which should generally increase linearly, by instantly changing the value, while ignoring the linear increase) between $t_{2,S}(n)$ and $t_{3,S}(m)$.

Finally, the present inventor will describe the one-way delay. Based on the definitions of the various quantities described above, the true one-way delay of the nth Sync message is $^-D_{MS}(n)$, and the true one-way delay of the mth Delay_Req message is $^-D_{SM}(m)$. The following properties are always established for both.

(Property 2)

For every n and m, $$^-D_{MS}(n) > 0$$

and $$^-D_{SM}(m) > 0$$

is always established.

Next, the true one-way delay difference (Jitter) $^{-}J_M$ can be calculated as follows.

$$^{-}J_M(n) = {}^{-}D_{MS}(n+1) - {}^{-}D_{MS}(n) =$$

$$\{(t_{2,S}(n+1) + O_{n+1}) - t_{1,M}(n+1)\} - \{(t_{2,S}(n) + O_n - t_{1,M}(n)\}$$

Here, $O_{n+1}$ and $O_n$ are time offsets between the clocks of the PTP slave and the PTP master at time $t_{2,S}(n+1)$, and time $t_{2,S}(n)$, respectively.

A difference between the value of $t_{2,S}(n+1) - t_{2,S}(n)$ and the correct elapsed time from $t_{2,S}(n)$ to $t_{2,S}(n+1)$ is equal to $O_{n+1} - O_n$. Therefore, similarly to the reliable RTT, when the difference between the value of $t_{2,S}(n+1) - t_{2,S}(n)$ and the correct elapsed time from $t_{2,S}(n)$ to $t_{2,S}(n+1)$ is negligibly small, the following equation holds.

$$O_{n+1} \approx O_n$$

At this time, $^{-}J_M$ can be calculated from only time stamp information as follows.

$$\mathcal{J}_M(n) \approx (t_{2,S}(n+1) - t_{1,M}(n+1)) - (t_{2,S}(n) - t_{1,M}(n))$$

Now, the following definitions are obtained.

Definition 3

1) When the error between the value of $t_{2,S}(n+1) - t_{2,S}(n)$ and the correct elapsed time from $t_{2,S}(n)$ to $t_{2,S}(n+1)$ is negligibly small, the present inventor calls $$J_M(n) = (t_{2,S}(n+1) - t_{1,M}(n+1)) - (t_{2,S}(n) - t_{1,M}(n))$$

the reliable one-way delay difference of the Sync message.

2) When the error between the value of $t_{3,S}(m+1) - t_{3,S}(m)$ and the correct elapsed time from $t_{3,S}(m)$ to $t_{3,S}(m+1)$ is negligibly small, $$J_S(m) = (t_{4,M}(m+1) - t_{3,S}(m+1)) - (t_{4,M}(m) - t_{3,S}(m))$$

is referred to as a reliable one-way delay difference of the Delay_Req message.

Furthermore, when it is not necessary to distinguish the two types of messages, the two types of differences are simply referred to as a reliable one-way delay difference.

<Estimation of Delay Range by RTT and Delay Difference Sequence>

Using the terms and properties described above, the present inventor can show the following lemma first.

(Lemma 4)

Assume that there are integers of $n=n_1<n_2 \ldots <n_P$ and $m=m_1<m_2< \ldots <m_P$ where $R(n_1, m_1)$, $R(n_2, m_2)$, ...., and $R(n_P, m_P)$ are all reliable RTTs, and all RTTs thereof are known. Also, the one-way delay difference between any two messages in each of the Sync message and the Delay_Req message is reliable, when one of $$R(i, j) \in \{R(n_1, m_1), R(n_2, m_2), \ldots, R(n_p, m_p)\}$$

is arbitrarily selected,

1) A number k that minimizes $^{-}D_{MS}(\ )$ among n, $n+1, \ldots, n_P-1, n_P$ is found, and a difference $J_M(i, k)$ between $^{-}D_{MS}(k)$ and $^{-}D_{MS}(i)$ is also found.

2) A number l that minimizes $^{-}D_{SM}(\ )$ among m, $m+1, \ldots, m_P-1, m_P$ is found, and a difference $J_S(j, l)$ between $^{-}D_{SM}(l)$ and $^{-}D_{SM}(j)$ is also found.

Figure 4:
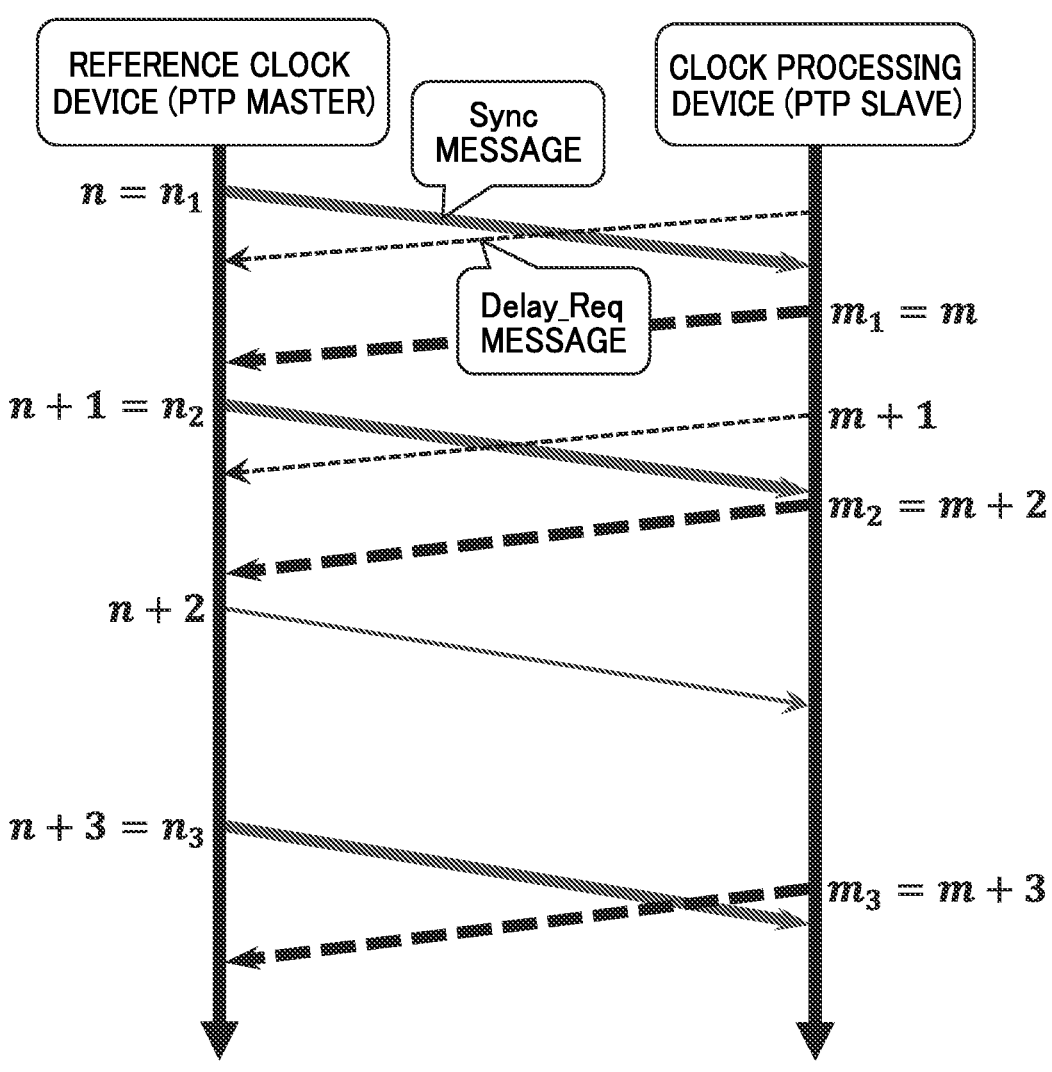
FIG. 4 is a diagram illustrating an example of exchange of a Sync message, a Delay_Req message, and a Delay_Resp message.

Before the proof, the present inventor will explain the assumed situation of the lemma in a little more detail. In general, both the Sync message and the Delay_Req message are exchanged asynchronously (FIG. 4). Therefore, there may be no corresponding Delay_Req message for a Sync message of any number, or conversely, two or more Delay_Req messages may be corresponding to a Sync message. Thus, the associated number is subscripted like $(n_P, m_P)$ for easy understanding.

(Proof)

Show 1) of Lemma 4. Fix q ($\neq$i) arbitrarily. When q>i, since the one-way delay difference between the ith and qth messages is reliable, which is obvious from Definition 3, a difference $J_{MS}(i, q)$ between $^{-}D_{MS}(i)$ and $^{-}D_{MS}(q)$ can be calculated as follows.

$$J_{MS}(i, q) = \overline{D}_{MS}(q) - \overline{D}_{MS}(i) \approx J_M(i) + J_M(i+1) + \ldots + J_M(q-1).$$

For q<i, the present inventor can calculate it in the same manner. A minimum value of $J_{MS}(j, k) \leq 0$ among $J_{MS}(i, n), \ldots, J_{MS}(i, p)$ corresponds to $D_{MS}(k)$.

2) of Lemma 4 is shown in the same way.

(Theorem 5 (Valid Delay Range))

Consider the same situation as in Lemma 4 and use the same letters. Then, establishing Property 2 for $n_1$, $n_1+1, \ldots, n_P$ and $m_1, m_1+1, \ldots, m_P$ is equivalent to establishing the following Equation for an arbitrary RTT $R(i, j)$ and minimum one-way delays $^{-}D_{MS}(k)$ and $^{-}D_{SM}(l)$.

$$J_M(k, i) < {}^{-}D_{MS}(i) < R(i, j) - J_S(l, j) \tag{6}$$

$$^{-}D_{SM}(j) = R(i, j) - {}^{-}D_{MS}(i)$$

Note that, the following Equations hold.

$$J_M(k, i) = -J_M(i, k) \approx \overline{D}_{MS}(i) - \overline{D}_{MS}(k) > 0$$

$$J_S(l, j) = -J_S(j, l) \approx \overline{D}_{SM}(j) - \overline{D}_{SM}(l) > 0$$

(Proof of Theorem 5)

Figure 5:
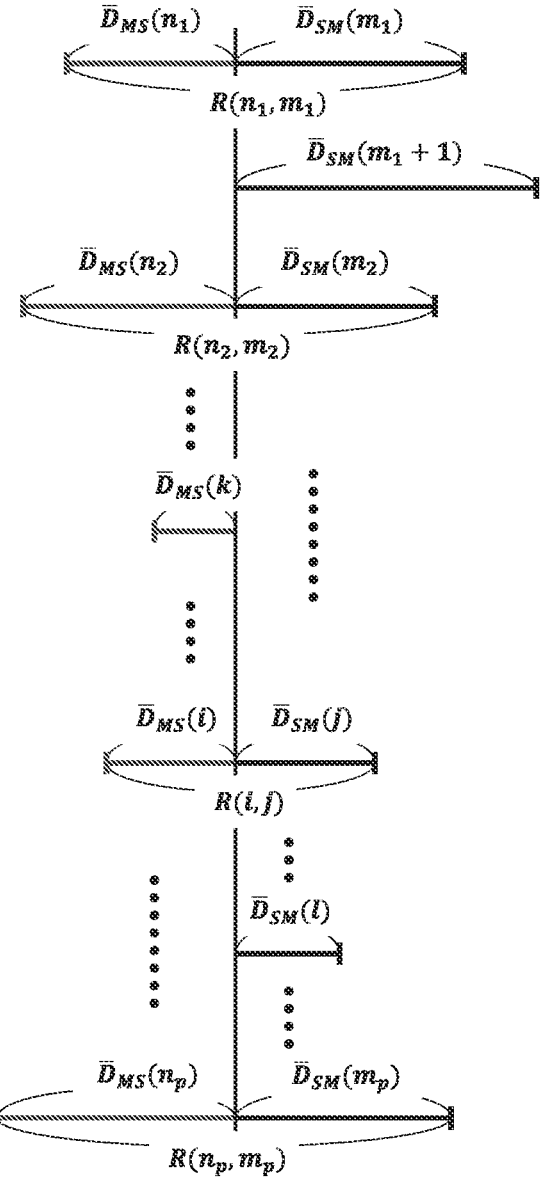
FIG. 5 is a diagram illustrating an example of a one-way delay and a round-trip delay.

The present inventor will prove theorem 5 with reference to FIG. 5,

The present inventor first shows Property 2=>Equation. Property 2 implies $^{-}D_{MS}(k)>0$. Since $^{-}D_{MS}(i)={}^{-}D_{MS}(k)+J_M(k, i)$, $J_M(k, i)<{}^{-}D_{MS}(i)$ holds. Similarly $J_S(l, j)<{}^{-}D_{SM}(j)$ is obtained for $^{-}D_{SM}$.

$^-D_{SM}(j)=R(i,j)-D_{MS}(i)<=>D_{MS}(i)=R(i, j)-^-D_{SM}(j)$ directly holds from the definition of RTT. Since $J_S(1, j)<^-D_{SM}(j)$ $(J_S(1, j)>0)$, $^-D_{MS}(i)<R(i, j)-J_S(1, j)$ is obtained.

The present inventor shows Equation (6)→Property 2. Since $^-D_{MS}(k)=^-D_{MS}(i)-J_M(k, i)$, $(J_M(k, i)>0)$, $^-D_{MS}(k)>0$ is obtained due to the first inequality of Equation (6). The second inequality and the equality in Equation (6) give $^-D_{SM}(j)>J_S(1, j)$. Due to $^-D_{SM}(l)=^-D_{SM}(i)-J_S(1, j)$, $(J_S(1, j)>0)$, $^-D_{SM}(l)>0$ is obtained. Since $^-D_{MS}(k)$ and $^-D_{SM}(l)$ are the respective minimum values, $^-D_{MS}(u)>0$ and $^-D_{SM}(v)>0$ hold for $n_1 \leq \forall u \leq n_P$, $m_1 \leq \forall v \leq m_P$.

<Inspection and Correction of One-way Delay>

As described above, when a frequency offset of the slave clock is appropriately maintained, the period during which the one-way delay difference can be reliable for Theorem 5 can be made longer.

As the reliable period in Theorem 5 is longer, there is a higher possibility that the minimum one-way delay can be updated, and the information can be used for a longer period. Therefore, the information on the valid range of the one-way delay obtained in Theorem 5 is used for verification and correction of an estimation result of the one-way delay.

(Algorithm (OWD Check and Correct))

Assume that a current time is t, $t=\max\{t_{2,S}(n_1), t_{3,S}(m_1)\}$, and a delay ratio of a downstream delay and an upstream delay used for estimation of a one-way delay is a:b. Furthermore, the one-way delay difference used in Theorem 5 is calculated together with the rate of the slave as in Equation (7). Here, $r_T(t)$ is a rate adjustment value, and is expressed by $r_T(t)=r_P(t)/(1+r_I(t))$ using a time difference reducing rate $r_P(t)$ and an intrinsic rate $r_I(t)$ to be described later.

$$J_M(n_0, n_1) = \frac{t_{2,S}(n_1) - t_{2,S}(n_0)}{1 + r_T(t)} - (t_{1,M}(n_1) - t_{1,M}(n_0)) \quad (7)$$

$$J_S(m_0, m_1) = (t_{4,M}(m_1) - t_{4,M}(m_0)) - \frac{t_{3,S}(m_1) - t_{3,S}(m_0)}{1 + r_T(t)}$$

Then, the one-way delay of the Sync message is checked and corrected by the following procedure.

1) Execute one-way delay estimation process to calculate $D_{MS}(n_1)$ and $D_{SM}(m_1)$.
2) Calculate a valid range of the true one-way delay $^-D_{MS}(n_1)$ using Theorem 5.
3) Output $D_{MS}(n_1)$ as the one-way delay of the $n_1$th Sync message in a case where $D_{MS}(n_1)$ is included in the valid range of 2), and the process ends. When it is not included in the valid range, the process goes to the next procedure.
4) Change the downstream and upstream delay ratio a:b used for estimating the one-way delay so that $D_{MS}(n_1)$ is included in the valid range of 2). Set the changed ratio to a:b, and go to Procedure 1).

Procedures 2) and 3) are referred to as a check phase, and Procedure 4) is referred to as a correct phase.

In this algorithm, an optimal correction method of the delay ratio a:b for estimating the one-way delay is not described, but for example, the following simple procedure can be used. First, suppose that $U<^-D_{MS}(n_1)<V$ is the valid range of the true one-way delay of the Sync message according to Theorem 5, and $D_{MS}(n_1)$ is the estimation result of the one-way delay.

1) Set a+1:b as a new delay ratio a:b, when $D_{MS}(n_1) \leq U$.
2) Set a:b+1 as a new delay ratio a:b, when $V \leq D_{MS}(n_1)$.

The above procedure is repeated until $U<D_{MS}(n_1)<V$ is satisfied.

System Configuration of Embodiment of Present Disclosure

Figure 6:
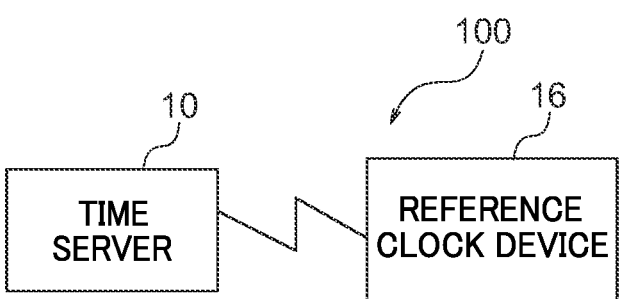
FIG. 6 is a diagram illustrating an example of a clock adjustment system according to an embodiment of the present disclosure.

A configuration of a clock adjustment system according to an embodiment of the present disclosure will be described. As illustrated in FIG. 6, the clock adjustment system 100 according to the embodiment of the present disclosure includes a clock processing device 10 and a reference clock device 16, and the clock processing device 10 and the reference clock device 16 are connected via a network.

The reference clock device 16 is a server device that transmits time information of a reference clock. Although a specific aspect of the reference clock device 16 will not be described, the reference clock device 16 includes a reference clock and distributes time information of the reference clock via a network.

Figure 7:
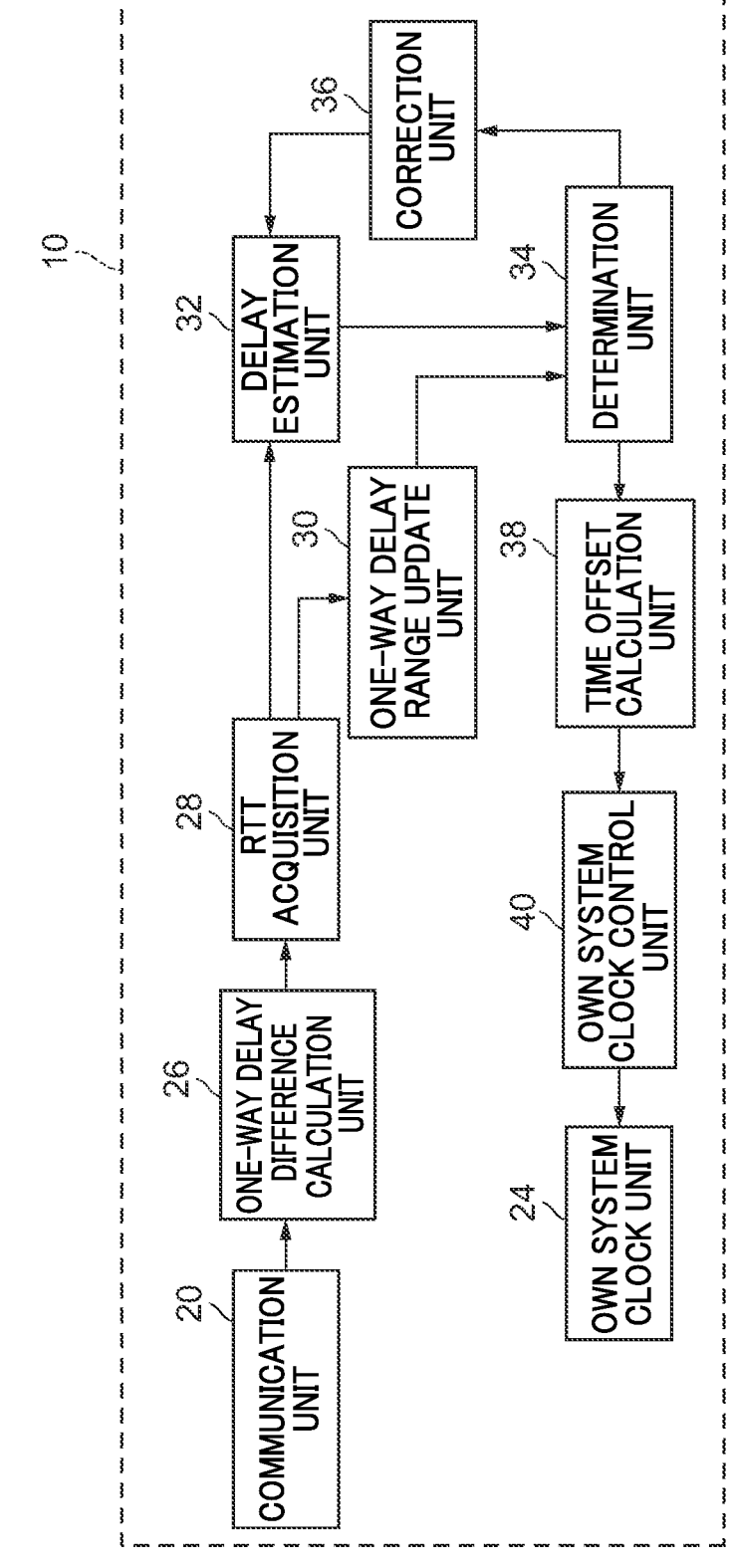
FIG. 7 is a block diagram illustrating a configuration of a clock processing device according to an embodiment of the present disclosure.

The clock processing device 10 according to the present embodiment can be configured by a computer including a CPU, a RAM, and a ROM storing programs and various data for executing various processing routines to be described later. As functionally illustrated in FIG. 7, the clock processing device 10 includes a communication unit 20, an own system clock unit 24, a one-way delay difference calculation unit 26, an RTT acquisition unit 28, a one-way delay range update unit 30, a delay estimation unit 32, a determination unit 34, a correction unit 36, a time offset calculation unit 38, and an own system clock control unit 40. Note that the RTT acquisition unit 28 is an example of an information acquisition unit, and the own system clock control unit 40 is an example of a rate determination unit.

The communication unit 20 transmits and receives a message to and from the reference clock device 16 via a network.

Specifically, the communication unit 20 receives the first message (Sync message) including time information of the reference clock from the reference clock device 16. The communication unit 20 transmits the second message (Delay_Req message) including the time information of the own system clock unit 24 to the reference clock device 16. The communication unit 20 receives the third message (Delay-_Resp message) including time information of the reference clock at the time of receiving the second message from the reference clock device 16.

The own system clock unit 24 determines time information of the own clock on the basis of the current rate, and outputs the time information to the communication unit 20. Note that the own system clock unit 24 is an example of a clock unit.

Furthermore, in a case where distributing the time information of the own clock to a client terminal is considered as an application, the time information of the own clock output from the own system clock unit 24 is transmitted to the client terminal via a network.

The one-way delay difference calculation unit 26 sets, as a temporary first one-way delay, a difference between the time information of the reference clock included in the Sync message and the time information of the own system clock unit 24 when the Sync message is received, and calculates a first one-way delay difference that is a difference between the temporary first one-way delays. The one-way delay difference calculation unit 26 sets, as a temporary second one-way delay, a difference between the time information included in the Delay_Req message and the time information of the reference clock, included in the Delay_Resp message, when the Delay_Req message is received, and calculates a second one-way delay difference that is a difference between the temporary second one-way delays.

Specifically, the Sync message and the Delay_Req message (Delay_Resp message) are transmitted and received asynchronously, and the time stamps $t_{1,M}$ and $t_{2,S}$ can be acquired when the Sync message is received, and the time stamps $t_{3,S}$ and $t_{4,M}$ can be acquired when the Delay_Resp message is received. The one-way delay difference calculation unit 26 operates at the timing of receiving each message. A one-way delay difference corresponding to each message is calculated, and a result is temporarily stored. The stored calculation result is used in subsequent process.

The procedure is summarized as follows.

1) In a case where the received message is a Sync message $(t_{1,M}(n), t_{2,S}(n))$ a) Calculate the first one-way delay difference $J_M(n-1, n)$ by the method of the above Equation (7) with reference to the current rate information $r_P$ and $r_f$.

b) Store the first one-way delay difference $J_M(n-1, n)$.

c) Input $t_{1,M}(n)$ and $t_{2,S}(n)$ to the RTT acquisition unit 28, and the processing of the one-way delay difference calculation unit 26 is ended.

2) In a case where the received message is a Delay_Req message $(t_{3,S}(m), t_{4,M}(m))$ a) Calculate the second one-way delay difference $J_S(m-1, m)$ by the method of the above Equation (7) with reference to the current rate information $r_P$ and $r_f$.

b) Store the second one-way delay difference $J_S(m-1, m)$.

c) Input $t_{3,S}(m)$ and $t_{4,M}(m)$ to the RTT acquisition unit 28, and the processing of the one-way delay difference calculation unit 26 is ended.

The RTT acquisition unit 28 acquires information for calculating RTT, which is the sum of the first one-way delay and the second one-way delay, using a combination of the Sync message, the Delay_Req message, and the Delay_Resp message to be calculated. Note that RTT is an example of a round-trip delay.

Specifically, whether the RTT is reliable is checked using the time stamp information of the received message.

In the PTP, since the Sync message $(t_{1,M}(n), t_{2,S}(n))$ is fundamental information of time information, a reliable RTT is calculated from time stamps $(t_{3,S}(m-1), t_{4,M}(m-1))$ and $(t_{3,S}(m), t_{4,M}(m))$ of preceding and subsequent Delay_Req messages with reference to $t_{1,M}(n), t_{2,S}(n)$.

Since these are the preceding and subsequent Delay_Req messages, $t_{3,S}(m-1)<t_{2,S}(n)<t_{3,S}(m)$ is satisfied. At this time, by using smaller one of time stamp information $$G_p = t_{2,S}(n) - t_{3,S}(m-1)$$

$$G_f = t_{3,S}(m) - t_{2,S}(n),$$

the reliable RTT is calculated. For example, when $G_f<G_P$, the reliable RTT is calculated using $t_{1,M}(n), t_{2,S}(n), t_{3,S}(m)$, and $t_{4,M}(m)$. In practice, as the time stamp information is used in subsequent process, $t_{1,M}(n), t_{2,S}(n), t_{3,S}(m)$, and $t_{4,M}(m)$ are input to the one-way delay range update unit 30 and the delay estimation unit 32. Note that the RTT may also be calculated and input by the RTT acquisition unit 28, or the RTT may be calculated in the subsequent process.

Here, in order to make the RTT reliable, it is not sufficient to simply take time stamps near $t_{2,S}(n)$, and it is also necessary to consider a length of $G_f$ (or $G_P$). Therefore, it is preferable that a user can set a maximum value of Gr. Furthermore, since the Sync message and the Delay_Req message are received asynchronously, not all time stamps near $t_{2,S}(n)$ are provided. Therefore, the received time stamp information is temporarily stored until the necessary information is obtained, and the processing is ended unless $t_{1,M}(n), t_{2,S}(n), t_{3,S}(m)$, and $t_{4,M}(m)$ by which the reliable RTT can be calculated are obtained.

The procedure is summarized as follows.

1) In a case where the reception time stamps are $t_{1,M}(n)$ and $t_{2,S}(n)$, store both the time stamps as $T_1$ and $T_2$, respectively, the processing of the RTT acquisition unit 28 ends, and the process does not go to the subsequent step.

2) In a case where the reception time stamps are $t_{3,S}(m)$ and $t_{4,M}(m)$, read the latest stored $T_1, T_2, T_3$, and $T_4$ as $t_{1,M}(n), t_{2,S}(n), t_{3,S}(m-1)$, and $t_{4,M}(m-1)$ respectively.

a) Overwrite $T_3$ with $t_{3,S}(m)$, and overwrite $T_4$ with $t_{4,M}(m)$.

b) In the case of $t_{2,S}(n) \leq t_{3,S}(m-1) \leq t_{3,S}(m)$, the processing of the RTT acquisition unit 28 is ended, and the process does not go to the subsequent step.

c) In the case of $t_{3,S}(m-1) \leq t_{2,S}(n) \leq t_{3,S}(m)$, i) Calculate $G_P=t_{2,S}(n)-t_{3,S}(m-1)$, $G_f=t_{3,S}(m)-t_{2,S}(n)$.

ii) When $G_P<G_f$ and $G_P \leq$ (user setting allowable value), input $t_{1,M}(n), t_{2,S}(n), t_{3,S}(m-1)$, and $t_{4,M}(m-1)$ to the one-way delay range update unit 30 and the delay estimation unit 32, and the processing of the RTT acquisition unit 28 is ended.

iii) When $G_P>=G_f$ and $G_f \leq$ (user setting allowable value), input $t_{1,M}(n), t_{2,S}(n), t_{3,S}(m)$, and $t_{4,M}(m)$ to the one-way delay range update unit 30 and the delay estimation unit 32, and the processing of the RTT acquisition unit 28 is ended.

iv) When min $\{G_P, G_f\}>$ (user setting allowable value), the processing of the RTT acquisition unit 28 is ended, and the process does not go to the subsequent step.

The one-way delay range update unit 30 calculates a first one-way delay difference that is a difference between the shortest time of the temporary first one-way delay and the latest temporary first one-way delay, and calculates a second one-way delay difference that is a difference between the shortest time of the temporary second one-way delay and the latest temporary second one-way delay. The one-way delay range update unit 30 updates the valid range of the first one-way delay determined using the information to calculate the RTT acquired by the RTT acquisition unit 28, and the first one-way delay difference and the second one-way delay difference.

Specifically, the information about the valid range of $D_{MS}(i)$ of Theorem 5 is updated. It is considered that a one-way delay difference within the past lace time from the current time is reliable. $I_{acc}$ may be a value set by a user, or may be automatically calculated from a change in a drift value, or the like.

The processing is performed by the following procedure.

1) Find numbers k and l at which the first one-way delay $^{-}D_{MS}(k)$ and the second one-way delay $^{-}D_{SM}(l)$ are minimum within the past $I_{acc}$ from the stored first one-way delay difference sequence $J_M(n-1, n)$ and second one-way delay difference sequence $J_S(m-1, m)$. In a case where there are a plurality of the minimum values, the larger (newer) number is used.

2) Calculate and store $D_{min}(i, j)=J_M(k, i), D_{max}(i, j)=R(i, j)-J_S(l, j)$ respectively.

3) The processing of the one-way delay range update unit 30 ends. Note that the stored result is referred to and used by the determination unit 34.

The delay estimation unit 32 estimates the first one-way delay using a predetermined estimation method.

For example, the first one-way delay is estimated using the ratio of the first one-way delay and the second one-way delay according to the following Equation.

$$D_{MS}(i) = [(t_{4,M}(i) - t_{1,M}(j)) - (t_{3,S}(j) - t_{2,S}(i))] \times a/(a + b)$$

The determination unit 34 uses the valid range of the first one-way delay to determine whether or not the first one-way delay estimated by the delay estimation unit 32 is consistent.

Here, for the number i, j, it is assumed that the processing of the one-way delay range update unit 30 has been completed ($D_{min}(i, j)$ and $D_{max}(i, j)$ have been calculated.). The processing is performed by the following procedure.

1) In a case where $D_{min}(i, j) < D_{MS}(i) < D_{max}(i, j)$, it is determined that the estimated first one-way delay is consistent, input $D_{MS}(i)$, $t_{1,M}(i)$, and $t_{2,S}(j)$ to the time difference calculation unit 38, and the processing of the determination unit 34 ends.

2) In a case where $D_{min}(i, j) < D_{MS}(i) < D_{max}(i, j)$ is not satisfied, it is determined that the estimated first one-way delay is not consistent, and the processing of the determination unit 34 ends.

In a case where the determination unit 34 determines that the estimated first one-way delay is not consistent, the correction unit 36 corrects the ratio between the first one-way delay and the second one-way delay.

Specifically, the correction unit 36 updates the ratio a:b used in the delay estimation unit 32 to satisfy $D_{min}(i, j) < D_{MS}(i) < D_{max}(i, j)$, and go to the processing of the delay estimation unit 32. Any method of updating is acceptable. For example, when $D_{MS}(i) \leq D_{min}(i, j)$, a+1:b is set to a new ratio a:b. When $D_{max}(i, j) \leq D_{MS}(i)$, a:b+1 is set as a new ratio a:b.

Until the determination unit 34 determines that the estimated first one-way delay is consistent, the correction by the correction unit 36, the estimation by the delay estimation unit 32, and the determination by the determination unit 34 are repeated.

The time offset calculation unit 38 calculates a current time offset between the time information of the own clock and the time information of the reference clock by using the first one-way delay estimated by the delay estimation unit 32.

For example, the current time offset is calculated according to the following equation.

$O(i) = t_{1,M}(i) + D_{MS}(i) - t_{2,S}(j)$. The calculation result is input to the own system clock control unit 40.

Based on the current time offset $O(t_i)$ calculated by the time offset calculation unit 38 and the previously calculated time offset $O(t_{i-1})$, the own system clock control unit 40 updates the time offset reducing rate $r_P(t_i)$ so as to increase the rate of the own clock when the reference clock advances with respect to the own clock and to decrease the rate of the own clock when the reference clock lags behind, and updates the intrinsic rate $r_I(t_i)$ based on the current time difference $O(t_i)$ according to the following equation.

$$r_P(t_i) = K_P o(t_i) + K_D \frac{o(t_i) - o(t_{i-1})}{t_i - t_{i-1}}$$

-continued
$$r_I(t_i) = K_I \sum_{k=I}^{i} (t_k - t_{k-1}) o(t_k)$$

where $t_{i-1}$ is a time when previous PID control calculation for obtaining the rate has worked, and $K_P$, $K_I$, and $K_D$ are PID constants for the control.

The own system clock control unit 40 determines the current rate $r(t_i)$ of the own clock according to the following Equation on the basis of the time offset reducing rate and the intrinsic rate, and outputs the current rate $r(t_i)$ to the own system clock unit 24.

$$r(t_i) = r_P(t_i) + r_I(t_i)$$

Furthermore, the time offset reducing rate $r_P$ and the intrinsic rate $r_I$ calculated above are stored for use by the one-way delay difference calculation unit 26.

Operation of Embodiment of Present Disclosure

Figure 8:
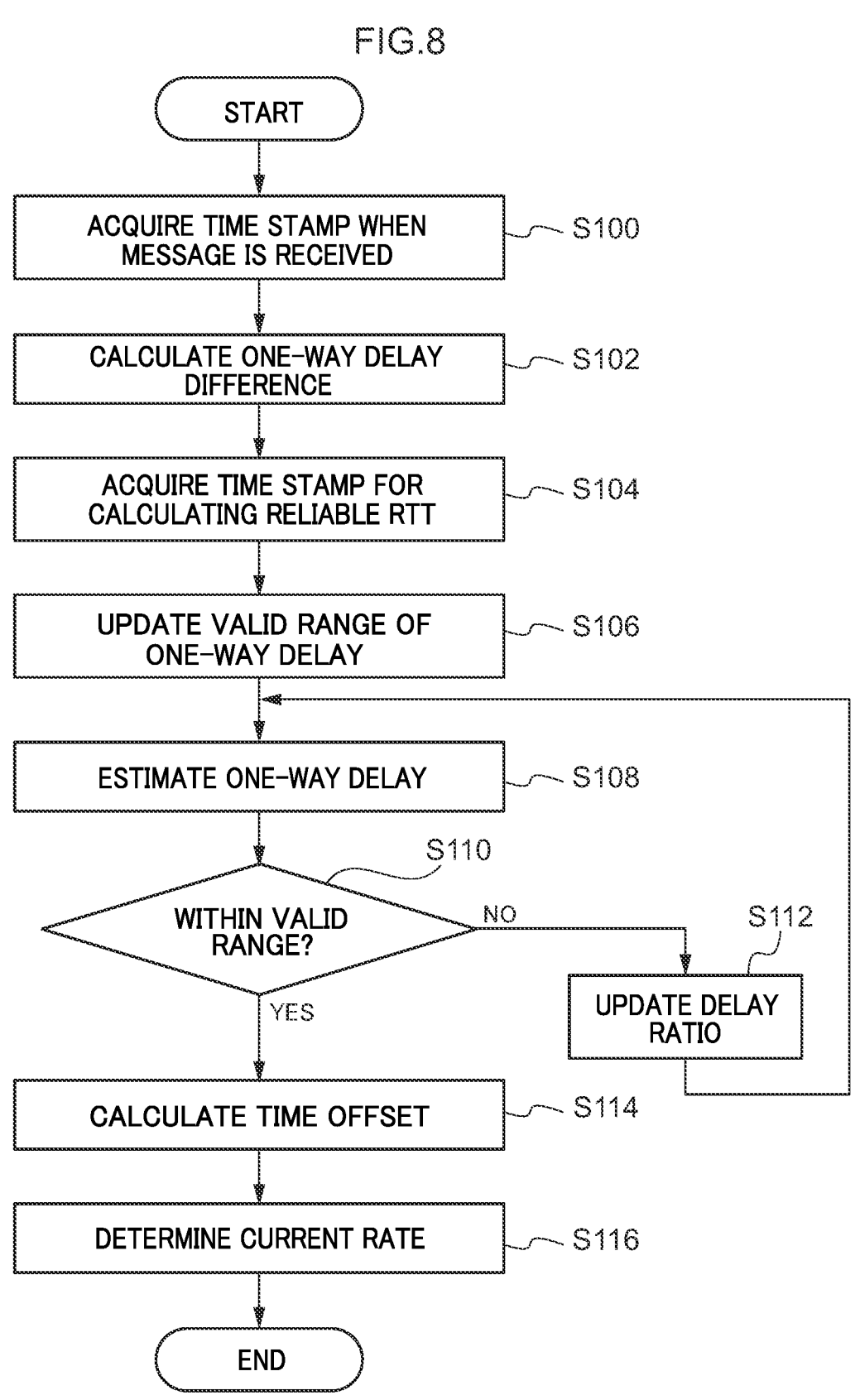
FIG. 8 is a diagram illustrating a flowchart of clock control processing of the clock processing device according to the embodiment of the present disclosure.
Figure 9:
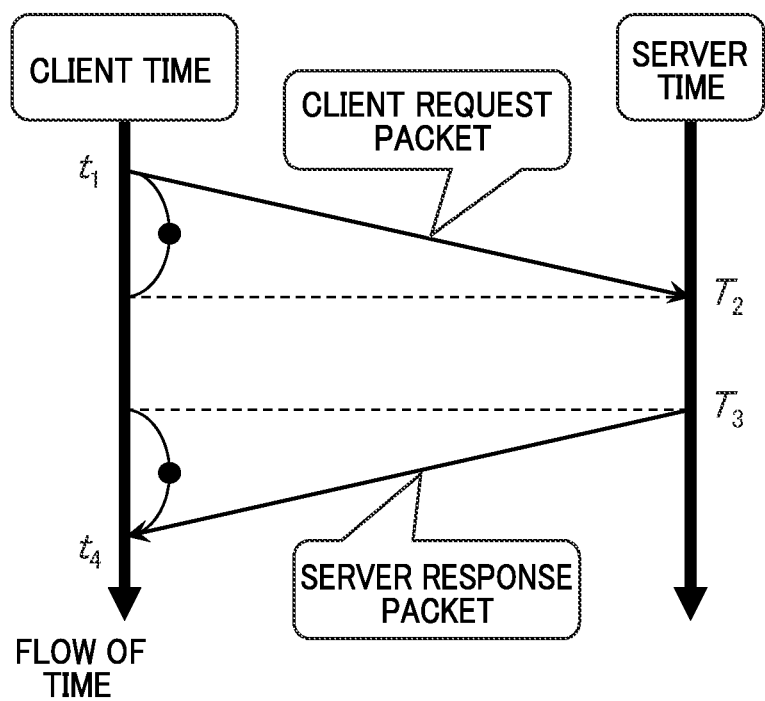
FIG. 9 is a diagram illustrating an example of exchange of time stamps between a server and a client.

Next, processing by the clock processing device 10 according to the embodiment of the present disclosure will be described with reference to FIG. 8. Every time the clock processing device 10 receives the Sync message or the Delay_Resp message from the reference clock device 16, the clock processing device 10 executes a clock control processing routine illustrated in FIG. 8.

First, in step S100, in a case where the received message is a Sync message ($t_{1,M}(n)$, $t_{2,S}(n)$), the one-way delay difference calculation unit 26 inputs the time stamps $t_{1,M}(n)$ and $t_{2,S}(n)$ to the RTT acquisition unit 28.

In a case where the received message is the Delay_Resp message ($t_{3,S}(m)$, $t_{4,M}(m)$), the one-way delay difference calculation unit 26 inputs the time stamps $t_{3,S}(m)$ and $t_{4,M}(m)$ to the RTT acquisition unit 28.

In step S102, in a case where the received message is the Sync message ($t_{1,M}(n)$, $t_{2,S}(n)$), the one-way delay difference calculation unit 26 calculates and stores the first one-way delay difference $J_M(n-1, n)$ with reference to the current rate information $r_P$ and $r_I$.

In a case where the received message is the Delay_Resp message ($t_{3,S}(m)$, $t_{4,M}(m)$), the one-way delay difference calculation unit 26 calculates and stores the second one-way delay difference $J_S(m-1, m)$ with reference to the current rate information $r_P$ and $r_I$.

In step S104, the RTT acquisition unit 28 acquires the time stamps $t_{1,M}(n)$, $t_{2,S}(n)$, $t_{3,S}(m)$, and $t_{4,M}(m)$ using the combination of the Sync message, the Delay_Req message, and the Delay_Resp message to be calculated.

In step S106, the one-way delay range update unit 30 calculates the first one-way delay difference and calculates the second one-way delay difference. Then, the one-way delay range update unit 30 updates the valid range of the first one-way delay.

In step S108, the delay estimation unit 32 estimates the first one-way delay by using the RTT, and the ratio of the first one-way delay and the second one-way delay.

In step S110, the determination unit 34 determines whether or not the first one-way delay estimated by the delay estimation unit 32 is consistent using the valid range of the first one-way delay. In a case where the first one-way delay estimated by the delay estimation unit 32 is within the valid range of the first one-way delay, the process proceeds to step S114. In a case where the first one-way delay estimated by the delay estimation unit 32 is out of the valid range of the first one-way delay, the process proceeds to step S112.

In step S112, in a case where the determination unit 34 determines that the estimated first one-way delay is not consistent, the correction unit 36 corrects the ratio of the first one-way delay and the second one-way delay, and the process returns to step S108.

In step S114, the time offset calculation unit 38 calculates the current time offset between the time information of the own clock and the time information of the reference clock by using the first one-way delay finally estimated in step S108.

In step S116, the own system clock control unit 40 updates the intrinsic rate and updates the time offset reducing rate based on the current time offset calculated by the time offset calculation unit 38.

The own system clock control unit 40 determines the current rate $r(t_i)$ of the own clock on the basis of the time offset reducing rate and the intrinsic rate, outputs the current rate $r(t_i)$ to the own system clock unit 24, and ends the clock control processing routine.

As described above, according to the clock processing device of the embodiment of the present disclosure, whether or not the estimated first one-way delay is consistent is determined using the valid range of the first one-way delay determined using the first one-way delay difference and the second one-way delay difference. As a result, even in a case where the one-way delay is different between the upstream and the downstream, the one-way delay can be accurately obtained. In addition, the time offset from the reference clock can be accurately obtained using the one-way delay, and the rate of the own clock can be appropriately adjusted.

Note that the present disclosure is not limited to the above-described embodiments, and various modifications and applications can be made without departing from the gist of the present disclosure.

In the above-described embodiment, the case of determining whether or not the estimated first one-way delay is consistent using the valid range of the first one-way delay has been described as an example, but the present disclosure is not limited thereto. For example, the delay estimation unit 32 may estimate the second one-way delay, the one-way delay range update unit 30 may update the valid range of the second one-way delay, and the determination unit 34 may determine whether or not the estimated second one-way delay is consistent using the valid range of the second one-way delay. In this case, the first one-way delay can be read as the second one-way delay by using $^-D_{SM}(j)=R(i, j)-^-D_{MS}(i)$ in the above embodiment.

(Supplement)

With regard to the above embodiments, the following supplementary notes are further disclosed.

(Supplement 1)

A clock processing device including:

a memory;

at least one processor connected to the memory; and a clock unit that outputs current time information, wherein the processor receives a first message including time information of a reference clock from a reference clock device, transmits, to the reference clock device, a second message including time information of the clock unit, and receives time information of the reference clock when the reference clock device received the second message, sets, as a temporary first one-way delay, a difference between the time information of the reference clock included in the first message and the time information of the clock unit when the first message is received and calculates a first one-way delay difference that is a difference between the temporary first one-way delays, and sets, as a temporary second one-way delay, a difference between the time information included in the second message and the time information of the reference clock when the second message is received and calculates a second one-way delay difference that is a difference between the temporary second one-way delays, acquires information for calculating a round-trip delay that is a sum of the temporary first one-way delay and the temporary second one-way delay using a combination of the first message and the second message to be calculated, estimates a first one-way delay or a second one-way delay using a predetermined estimation method, and calculates a first one-way delay difference that is a difference between a shortest time of the temporary first one-way delay and latest the temporary first one-way delay, calculates a second one-way delay difference that is a difference between a shortest time of the temporary second one-way delay and latest the temporary second one-way delay, and determines whether or not the estimated first one-way delay or second one-way delay is consistent by using a valid range of the first one-way delay or the second one-way delay determined using the information acquired by the information acquisition unit, the calculated first one-way delay difference, and the calculated second one-way delay difference.

(Supplement 2)

A non-transitory storage medium including a clock unit that outputs current time information, and storing a program executable by a computer to perform clock processing, wherein the clock processing includes:

receiving a first message including time information of a reference clock from a reference clock device;

transmitting, to the reference clock device, a second message including time information of the clock unit, and receives time information of the reference clock when the reference clock device received the second message;

setting, as a temporary first one-way delay, a difference between the time information of the reference clock included in the first message and the time information of the clock unit when the first message is received and calculating a first one-way delay difference that is a difference between the temporary first one-way delays, and setting, as a temporary second one-way delay, a difference between the time information included in the second message and the time information of the reference clock when the second message is received and calculating a second one-way delay difference that is a difference between the temporary second one-way delays;

acquiring information for calculating a round-trip delay that is a sum of the temporary first one-way delay and the temporary second one-way delay using a combination of the first message and the second message to be calculated;

estimating a first one-way delay or a second one-way delay using a predetermined estimation method; and calculating a first one-way delay difference that is a difference between a shortest time of the temporary first one-way delay and latest the temporary first one-way delay, calculating a second one-way delay difference that is a difference between a shortest time of the temporary second one-way delay and latest the temporary second one-way delay, and determining whether or not the estimated first one-way delay or second one-way delay is consistent by using a valid range of the first one-way delay or the second one-way delay determined using the information acquired by the information acquisition unit, the calculated first one-way delay difference, and the calculated second one-way delay difference.

The disclosure of Japanese Patent Application No. 2021-083229 is incorporated herein by reference in its entirety.

All documents, patent applications, and technical standards described in this specification are incorporated herein by reference to the same extent as if each individual document, patent application, and technical standard were specifically and individually described to be incorporated by reference.

The invention claimed is:

1. A clock processing device comprising:
a memory;
at least one processor coupled to the memory; and
a clock unit that outputs a current time,
wherein the at least one processor,
receives, from a reference clock device, a first message including a time stamp of a reference clock,
transmits, to the reference clock device, a second message including a time stamp of the clock unit, and
receives a time stamp of the reference clock when the reference clock device received the second message;
sets, as a temporary downstream one-way delay, a difference between the time stamp of the reference clock included in the first message and the time stamp of the clock unit when the first message is received and calculates a downstream one-way delay difference that is a difference between the temporary downstream one-way delays, and sets, as a temporary upstream one-way delay, a difference between the time stamp included in the second message and the time stamp of the reference clock when the second message is received and calculates a upstream one-way delay difference that is a difference between the temporary upstream one-way delays;
calculates a round-trip delay that is a sum of the temporary downstream one-way delay and the temporary upstream one-way delay using a combination of the first message and the second message;
estimates a downstream one-way delay or an upstream one-way delay using a predetermined estimation method; and
calculates a latest downstream one-way delay difference that is a difference between a shortest time of the temporary downstream one-way delay and the latest temporary downstream one-way delay, calculates a latest upstream one-way delay difference that is a difference between a shortest time of the temporary upstream one-way delay and a latest temporary upstream one-way delay, and determines whether or not the estimated downstream one-way delay or the estimated upstream one-way delay time is consistent by using a valid range of the downstream one-way delay or the upstream one-way delay determined using the calculated downstream one-way delay difference and the calculated upstream one-way delay difference.

2. The clock processing device according to claim 1,
wherein the at least one processor corrects the estimated downstream one-way delay or the estimated upstream one-way delay,
wherein the at least one processor estimates the downstream one-way delay or the upstream one-way delay by using a ratio of the downstream one-way delay and the upstream one-way delay, and
wherein the at least one processor adjusts the ratio so that the at least one processor determines that the estimated downstream one-way delay or upstream one-way delay is consistent, and the at least one processor re-estimates the downstream one-way delay or the upstream one-way delay by using the adjusted ratio.

3. The clock processing device according to claim 1,
wherein the at least one processor calculates a current time difference between the clock unit and the reference clock by using the estimated downstream one-way delay time, the time stamp of the reference clock included in the first message, and the time stamp of the clock unit when the first message is received; and
wherein the at least one processor determines a current rate for the clock unit based on the current time difference.

4. A non-transitory storage medium storing a program executable by a computer to perform clock processing,
wherein the clock processing includes:
receiving, from a reference clock device, a first message including time stamp of a reference clock;
transmitting, to the reference clock device, a second message including time stamp of clock unit that outputs current time, and
receiving time stamp of the reference clock when the reference clock device received the second message;
setting, as a temporary downstream one-way delay, a difference between the time stamp of the reference clock included in the first message and the time stamp of the clock unit when the first message is received and calculating a latest downstream one-way delay difference that is a difference between the temporary upstream one-way delays, and setting, as a temporary upstream one-way delay, a difference between the time stamp included in the second message and the time stamp of the reference clock when the second message is received and calculating an upstream one-way delay difference that is a difference between the temporary upstream one-way delays;
calculating a round-trip delay that is a sum of the temporary downstream one-way delay and the temporary upstream one-way delay using a combination of the first message and the second message;
estimating a downstream one-way delay or an upstream one-way delay using a predetermined estimation method; and
calculating a latest downstream one-way delay difference that is a difference between a shortest time of the temporary downstream one-way delay and a latest temporary downstream one-way delay, calculating a latest upstream one-way delay difference that is a difference between a shortest time of the temporary upstream one-way delay and a latest temporary upstream one-way delay, and determining whether or not the estimated downstream one-way delay or upstream one-way delay is consistent by using an valid range of the downstream one-way delay or the upstream one-way delay determined using the calculated downstream one-way delay difference and the calculated upstream one-way delay difference.

\* \* \* \* \*